United States Patent
Nakagawa

(10) Patent No.: US 12,454,055 B2
(45) Date of Patent: Oct. 28, 2025

(54) WELDING PROGRAM PRODUCTION SYSTEM AND WELDING PROGRAM PRODUCTION METHOD

(71) Applicant: DAIHEN Corporation, Osaka (JP)

(72) Inventor: Shinichiro Nakagawa, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 327 days.

(21) Appl. No.: 17/900,466

(22) Filed: Aug. 31, 2022

(65) Prior Publication Data
US 2023/0106119 A1   Apr. 6, 2023

(30) Foreign Application Priority Data
Sep. 24, 2021   (JP) .................. 2021-155201

(51) Int. Cl.
| | |
|---|---|
| B25J 9/16 | (2006.01) |
| B25J 19/02 | (2006.01) |
| B65G 59/02 | (2006.01) |
| G06Q 10/08 | (2024.01) |
| G06T 7/60 | (2017.01) |
| G06T 7/73 | (2017.01) |
| G06T 11/20 | (2006.01) |
| B23K 37/02 | (2006.01) |

(52) U.S. Cl.
CPC .......... *B25J 9/1664* (2013.01); *B25J 9/1671* (2013.01); *G06T 7/73* (2017.01); *G06T 11/203* (2013.01); *B23K 37/0229* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 10,688,660 B2* | 6/2020 | Ge ................... | B25J 9/1664 |
| 2017/0235301 A1 | 8/2017 | Hiroyuki et al. | |
| 2021/0114131 A1 | 4/2021 | Hazui et al. | |
| 2021/0354308 A1* | 11/2021 | Sullivan ............... | B23K 9/04 |
| 2022/0410402 A1* | 12/2022 | Lonsberry ............. | G06V 10/25 |
| 2024/0261909 A1* | 8/2024 | Akey ................... | B25J 11/005 |

FOREIGN PATENT DOCUMENTS

| | | |
|---|---|---|
| JP | H 08243773 | 9/1996 |
| JP | 2010-269336 A | 12/2010 |
| JP | 6370821 | 7/2018 |
| KR | 10-2020-0108898 A | 9/2020 |

\* cited by examiner

*Primary Examiner* — Khoi H Tran
*Assistant Examiner* — Alyse Tramanh Tran
(74) *Attorney, Agent, or Firm* — Sterne, Kessler, Goldstein & Fox P.L.L.C.

(57) ABSTRACT

Provided is a welding program production system that can increase efficiency of a welding operation by a welding robot. The welding program production system includes a display control unit that causes a plurality of candidate welding lines detected on the basis of an image of a photographed object to be welded to be displayed in superimposed relation on the image, an input receiving unit that receives an input to select the welding lines from among the plurality of candidate welding lines and an input to specify a welding order and a welding direction for each of the selected welding lines, and a program production unit that produces a welding program on the basis of the specified welding order and welding direction.

5 Claims, 5 Drawing Sheets

WELDING PROGRAM PRODUCTION SYSTEM AND WELDING PROGRAM PRODUCTION METHOD

BACKGROUND

Field

The present invention relates to a welding program production system and a welding program production method.

Description of Related Art

Japanese Patent No. 6370821 discloses a technology in which a program for operating a welding robot is generated offline. In this technology, the program is automatically generated such that respective three-dimensional models of the robot and works are arranged in a virtual space, respective reference positions of the arranged robot and works are automatically set, an order in which the robot is to move between the plurality of works on the basis of the reference positions is automatically determined, and the robot moves in the determined order.

SUMMARY

In the technology in Japanese Patent No. 6370821, when the order in which the robot is to move is determined, respective distances of all the routes that may be formed by the plurality of works are calculated, and the order in which the robot is to move is determined on the basis of the route having the shortest distance among the calculated distances. However, the route having the shortest distance does not necessarily increase efficiency of a welding operation.

It is therefore an object of the present invention to provide a welding program production system and a welding program production method which can increase efficiency of a welding operation by a welding robot.

A welding program production system according to an aspect of the present invention includes: a display control unit that causes a plurality of candidate welding lines detected on the basis of an image of a photographed object to be welded to be displayed in superimposed relation on the image; an input receiving unit that receives an input to select the welding lines from among the plurality of candidate welding lines and an input to specify a welding order and a welding direction for each of the selected welding lines; and a program production unit that produces a welding program on the basis of the specified welding order and welding direction.

According to this aspect, it is possible to cause the candidate welding lines detected from the photographed image of the object to be welded to be displayed in superimposed relation on the image, receive the specification of the welding order and the welding direction for each of the welding lines selected from among the candidate welding lines, and produce the welding program on the basis of the specified order and direction. Accordingly, by sequentially specifying the welding orders and the welding directions for the plurality of candidate welding lines displayed in superimposed relation on the image of the object to be welded, it is possible to easily and efficiently produce the welding program.

In the above aspect, the welding program production system may also further include: a determination unit that determines a range weldable by the welding robot on the basis of a position at which the welding robot is to be disposed, and the display control unit may also cause the candidate welding lines which are among the plurality of candidate welding lines and present within the weldable range determined by the determination unit to be displayed in superimposed relation on the image.

According to this aspect, the welding program can be produced on the basis of the orders and the directions specified for the candidate welding lines present in the range weldable by the welding robot. Therefore, it is possible to perform a welding operation without waste.

In the above aspect, the input receiving unit may also receive, as the input to specify the welding direction, an input to specify a welding starting position and a welding ending position.

According to this aspect, the welding program can be produced by specifying the welding starting position and the welding ending position. Therefore, it is possible to improve accuracy of the welding program.

In the above aspect, the input receiving unit may also receive, as the input to specify the welding direction, an input to trace each of the welding lines.

According to this aspect, the welding direction can be specified by tracing the welding lines displayed on a screen. Therefore, it is possible to simplify the input and improve reliability thereof.

In the above aspect, the welding program production system may also further include: a welding line detection unit that calculates, on the basis of the image, coordinate data corresponding to the object to be welded and detects, on the basis of the coordinate data, the plurality of candidate welding lines.

According to this aspect, the candidate welding lines can be detected on the basis of planes of the object to be welded which are represented by the coordinate data calculated from the image of the object to be welded. Therefore, it is possible to improve accuracy of detection of the welded lines.

A welding program production method according to another aspect of the present invention is a method to be implemented by a processor and includes the steps of: causing a plurality of candidate welding lines detected on the basis of an image of a photographed object to be welded to be displayed in superimposed relation on the image; receiving an input to select the welding lines from among the plurality of candidate welding lines and an input to specify a welding order and a welding direction for each of the selected welding lines; and producing a welding program on the basis of the specified welding order and welding direction.

According to this aspect, it is possible to cause the candidate welding lines detected from the photographed image of the object to be welded to be displayed in superimposed relation on the image, receive the specification of the welding order and the welding direction for each of the welding lines selected from among the candidate welding lines, and produce the welding program on the basis of the specified order and direction. Accordingly, by sequentially specifying the welding orders and the welding directions for the plurality of candidate welding lines displayed in superimposed relation on the image of the object to be welded, it is possible to easily and efficiently produce the welding program.

According to the present invention, it is possible to provide a welding program production system and a welding program production method which can increase efficiency of a welding operation by a welding robot.

DETAILED DESCRIPTION

Referring to the accompanying drawings, a description will be given of a preferred embodiment of the present invention. Note that, throughout the individual drawings, components denoted by the same reference signs have the same or similar configurations. In addition, since the drawings are schematic, dimensions or ratios of the individual components are different from those of real components.

Figure 1:
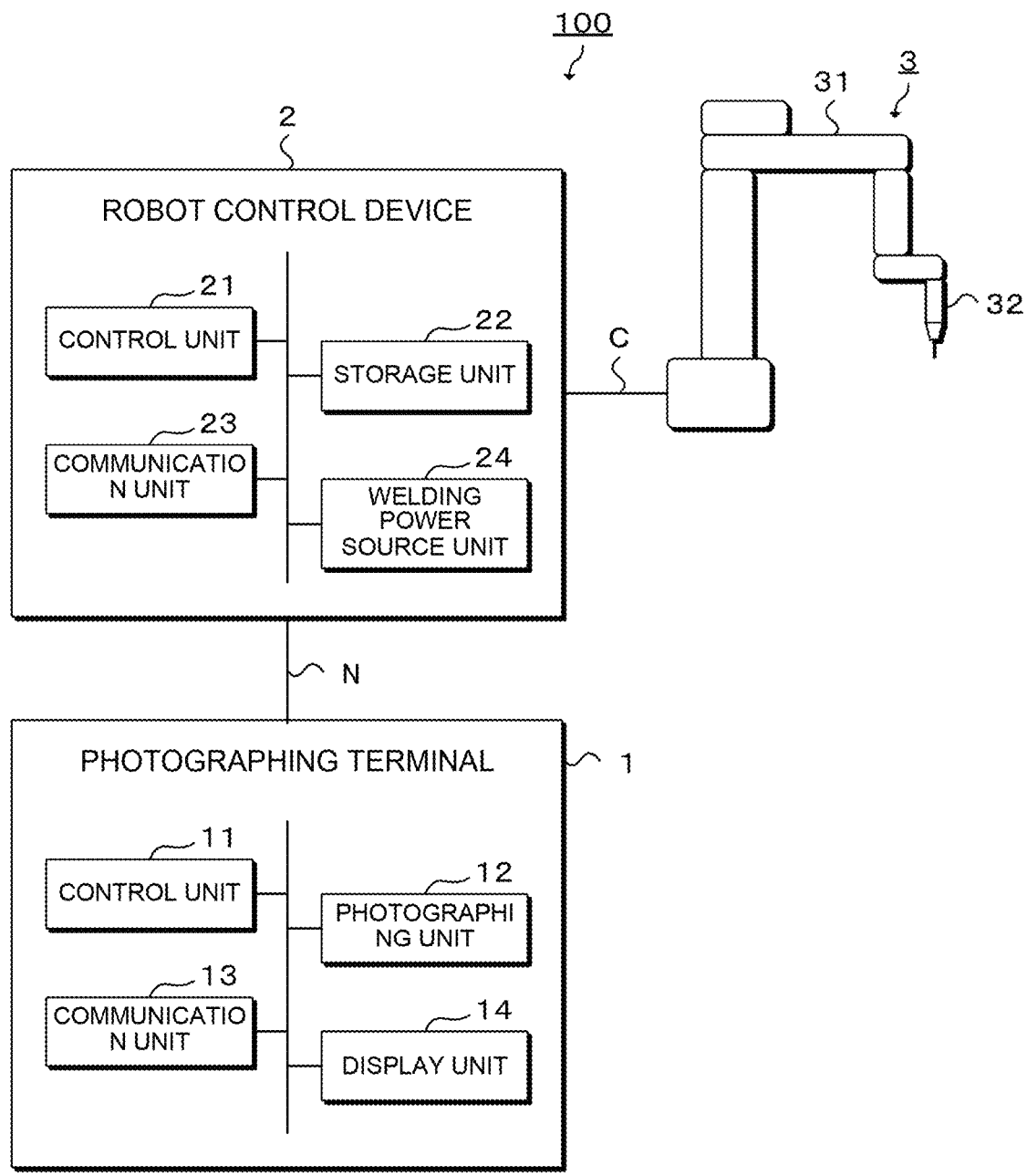
FIG. 1 is a diagram illustrating an example of a configuration of a welding robot system including a welding program production system according to an embodiment.

FIG. 1 is a diagram illustrating an example of a configuration of a welding robot system including a welding program production system according to the embodiment. A welding robot system 100 includes, e.g., a photographing terminal 1, a robot control device 2, and a manipulator 3. The photographing terminal 1 and the robot control device 2 are connected via, e.g., a network N, while the robot control device 2 and the manipulator 3 are connected via, e.g., a communication cable C. The network N may be either wired (including the communication cable) or wireless. Note that the welding robot system 100 may also include a teaching pendant. The teaching pendant is an operating device through which an operator teaches the manipulator 3 an operation to be performed.

The manipulator 3 is a welding robot that performs arc welding according to execution conditions set in the robot control device 2. The manipulator 3 includes, e.g., a multi-junction arm 31 provided on a base member fixed to a floor surface or the like in a factory and a welding torch 32 connected to a leading end of the multi-junction arm 31.

The robot control device 2 is a control unit that controls an operation of the manipulator 3 and includes, e.g., a control unit 21, a storage unit 22, a communication unit 23, and a welding power source unit 24.

The control unit 21 controls the manipulator 3 and the welding power source unit 24 through, e.g., execution of a welding program stored in the storage unit 22 by a processor.

The communication unit 23 controls communication with the photographing terminal 1 connected thereto via the network N and communication with the manipulator 3 connected thereto via the communication cable C.

The welding power source unit 24 supplies, according to welding execution conditions determined in advance, a welding current, a welding voltage, and the like to the manipulator 3 so as to, e.g., generate an arc between a leading end of a welding wire and a work. Examples of the welding execution conditions include data items such as welding conditions, a welding starting position, a welding ending position, an arc discharge period, a welding distance, a posture of the welding torch, and a moving speed of the welding torch. The welding power source unit 24 may also be provided separately from the robot control device 2.

The photographing terminal 1 is, e.g., a digital camera, but may also be a portable terminal with a digital camera. Examples of the portable terminal include transportable terminals such as a tablet terminal, a smartphone, a personal data assistant (PDA), and a notebook PC (personal computer). The photographing terminal 1 includes, e.g., a control unit 11, a photographing unit 12, a communication unit 13, and a display unit 14.

The control unit 11 controls each of the components of the photographing terminal 1 through execution of a predetermined program stored in a memory by the processor.

The photographing unit 12 includes, e.g., a lens and an image capturing element (image sensor) and converts light from a photographed object that has been received by the lens to an electric signal (digital image data).

The communication unit 13 controls communication with the robot control device 2 connected thereto via the network N.

The display unit 14 is, e.g., a display having a touch panel, and displays a screen image of the object photographed by the photographing unit 12, while receiving an input of an operation instruction from the operator or the like. The display unit 14 may also be provided as, e.g., a display device having a touch panel separately from the photographing terminal 1.

Figure 2:
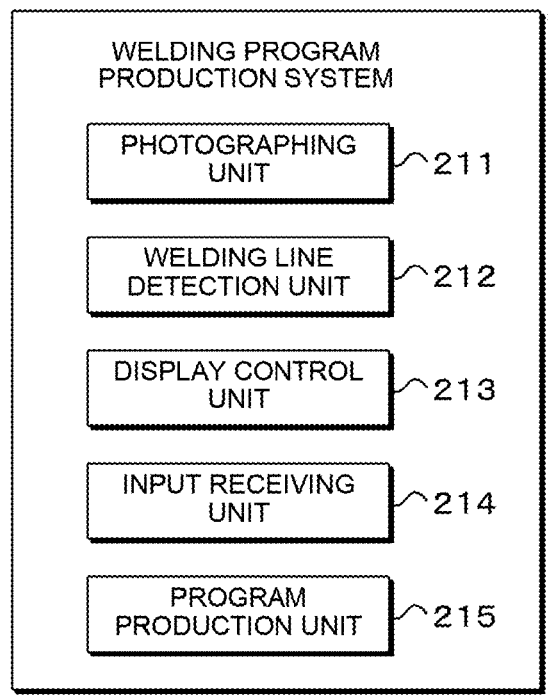
FIG. 2 is a diagram illustrating an example of a functional configuration of the welding program production system.

FIG. 2 is a diagram illustrating an example of a functional configuration of the welding program production system according to the present invention. For example, the welding program production system includes, as the functional configuration, a photographing unit 211, a welding line detection unit 212, a display control unit 213, an input receiving unit 214, and a program production unit 215. Among these functions, the photographing unit 211 is the function included in the photographing terminal 1. Meanwhile, all of the welding line detection unit 212, the display control unit 213, the input receiving unit 214, and the program production unit 215 may be included in either of the photographing terminal 1 and the robot control device 2, or the individual functions may also be distributed to the photographing terminal 1 and the robot control device 2 to be included therein. Alternatively, another device other than the photographing terminal 1 and the robot control device 2 may also include any or all of the functions described above.

Figure 3:
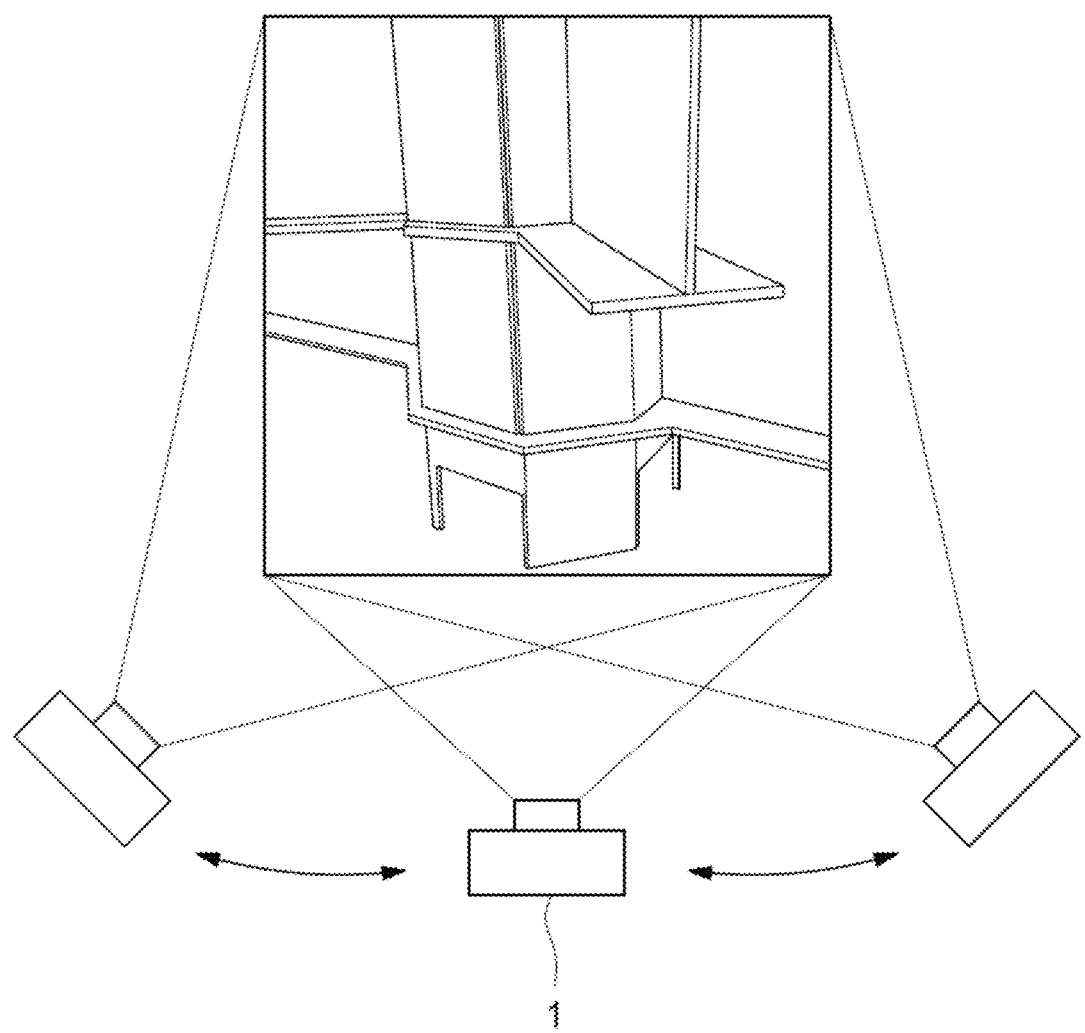
FIG. 3 is a diagram illustrating an example of an object to be welded.

The photographing unit 211 is the same as the photographing unit 12 of the photographing terminal 1 described above. The photographing unit 211 according to the present embodiment photographs, e.g., a structure including a plurality of iron plate members (works) serving as objects to be arc-welded as an object to be welded. FIG. 3 illustrates an example of the object to be welded. In FIG. 3, the structure formed by joining and combining the plurality of works together is illustrated as the object to be welded. The photographing unit 211 may also photograph the object to be welded at a plurality of different positions.

The welding line detection unit 212 illustrated in FIG. 2 detects candidate welding lines on the basis of an image of the object to be welded that has been photographed by the photographing unit 211. As a method of detecting the candidate welding lines, e.g., the following method can be used.

First, the welding line detection unit 212 calculates coordinate data sets corresponding to the object to be welded on the basis of the image of the object to be welded, and plots the coordinate data sets as point group data sets in a user coordinate system.

The coordinate data sets corresponding to the object to be welded described above can be acquired by using, e.g., a distance measurement sensor. As the distance measurement sensor, e.g., a LiDAR (Light Detection and Ranging) sensor, a millimeter wave sensor, an ultrasonic wave sensor, or the like can be used. Alternatively, the coordinate data sets corresponding to the object to be welded may also be acquired by being arithmetically determined on the basis of a plurality of images obtained by photographing the object to be welded at a plurality of different positions. In this case, it is possible to use a three-dimensional measurement method based on a known stereo method.

The user coordinate system mentioned above can be set by, e.g., placing a marker in a space formed by the object to be welded. Specifically, by using a position of the marker included in the screen image captured by the photographing unit 211 as an origin, a three-dimensional orthogonal coordinate system including an X-axis, a Y-axis, and a Z-axis which are orthogonal to each other at the origin is set as the user coordinate system.

The marker mentioned above may appropriately be an identifier capable of causing the photographing unit 211 to recognize that the marker is placed in the space but, preferably, an AR marker is used. By using the AR marker, when the AR marker placed in the space is recognized, the user coordinate system using the AR marker as the origin can easily be displayed in superimposed relation on a real screen image.

Subsequently, the welding line detection unit 212 detects, on the basis of the point group data sets plotted in the user coordinate system, the candidate welding lines included in the object to be welded. Specifically, the welding line detection unit 212 recognizes, on the basis of the point group data, a plurality of planes corresponding to the object to be welded, and detects a line of intersection between the two planes included in the plurality of planes as the candidate welding line. For example, the welding line detection unit 212 recognizes a plane represented by the coordinate data set corresponding to a work Wa illustrated in FIG. 4 and a plane represented by the coordinate data set corresponding to a work Wb illustrated in FIG. 4, and detects a line of intersection Li between these two planes as one of the candidate welding lines. When the candidate welding line is to be detected, it is preferable to detect the end-to-end line of intersection between the two planes as the candidate welding line.

Figure 4:
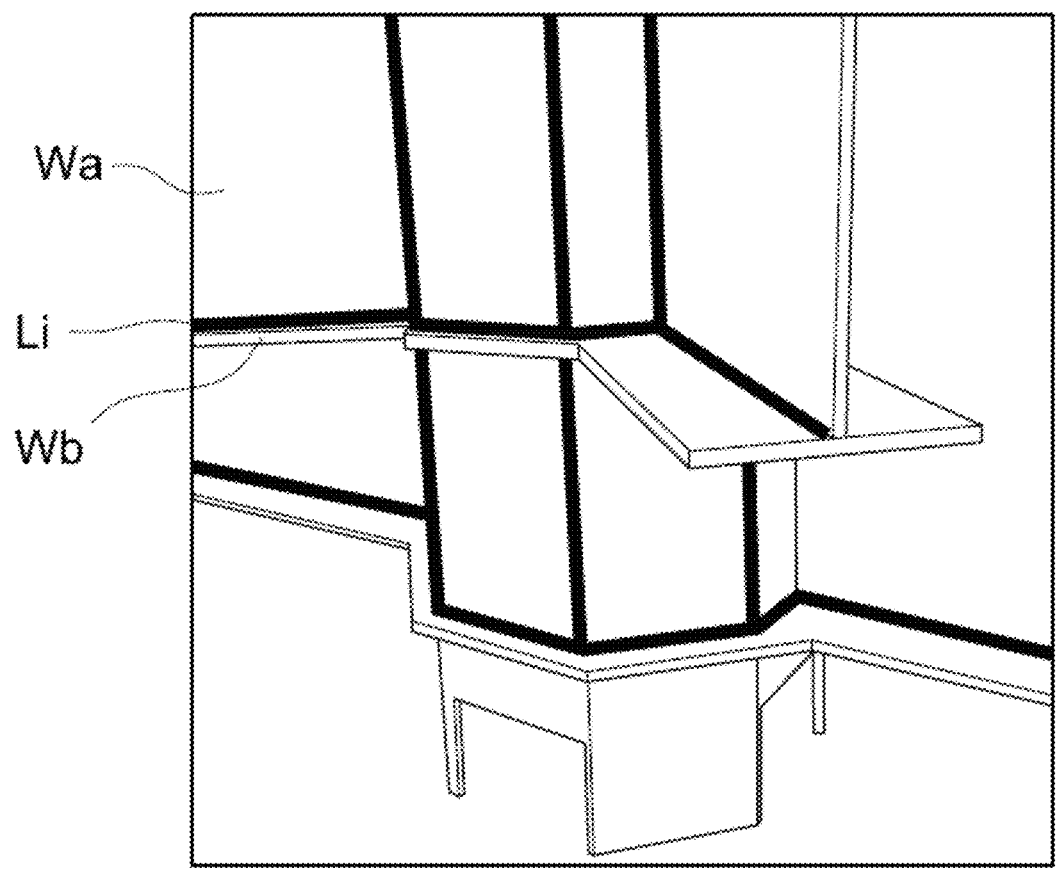
FIG. 4 is a diagram illustrating an example of welding lines displayed in superimposed relation on the object to be welded in FIG. 3.

The display control unit 213 illustrated in FIG. 2 causes the plurality of candidate welding lines detected by the welding line detection unit 212 to be displayed in superimposed relation on the screen image captured by the photographing unit 211. In FIG. 4, the plurality of candidate welding lines are displayed in superimposed relation on the screen image captured by the photographing unit 211.

The input receiving unit 214 illustrated in FIG. 2 receives an input to specify a welding order and a welding direction for each of the welding lines selected by the operator from among all the candidate welding lines that are included in the screen image. An input to select the welding line and the input to specify the welding order and the welding direction can be received by using, e.g., the touch panel of the display unit 14 of the photographing terminal 1.

Figure 5:
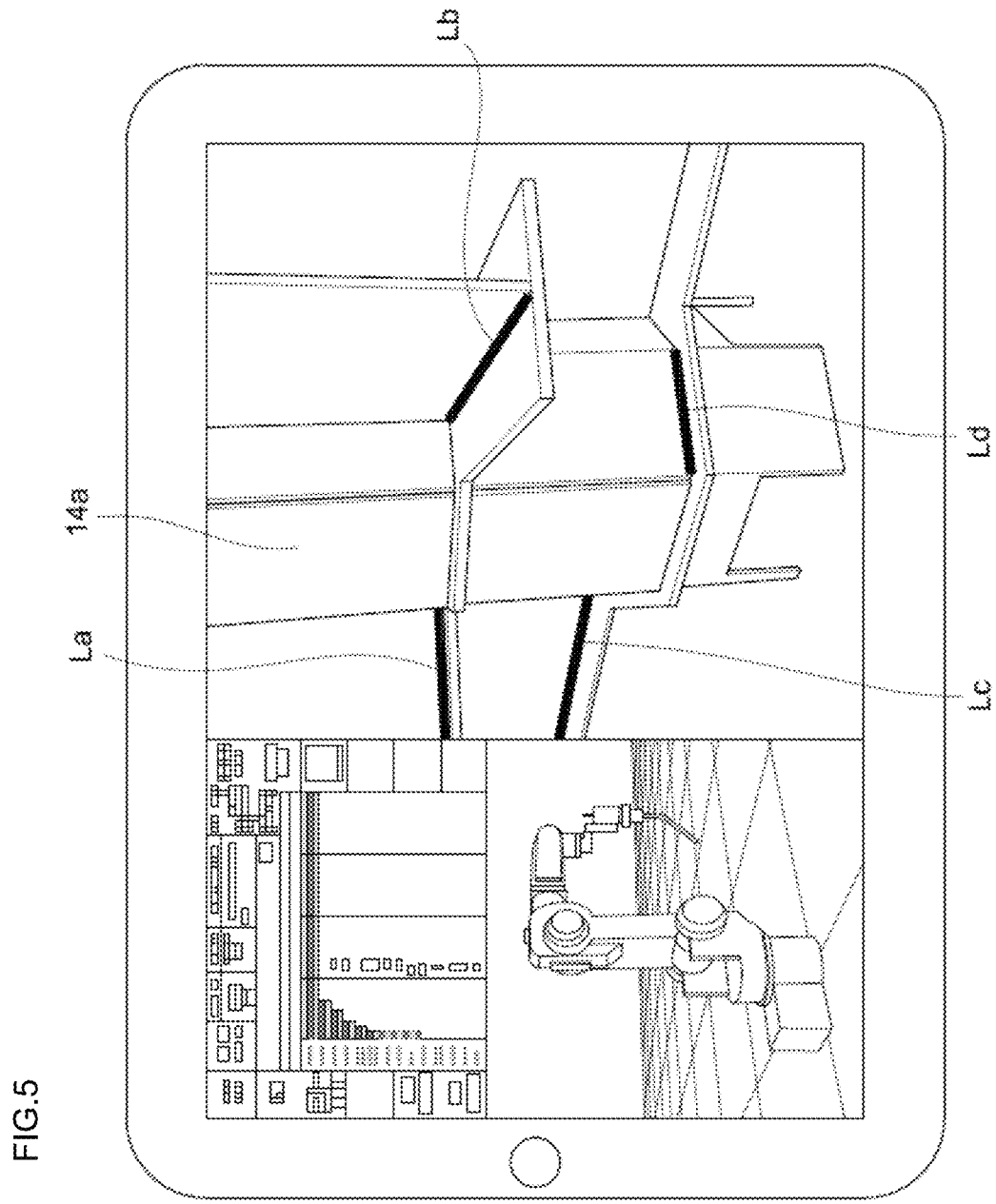
FIG. 5 is a diagram illustrating an example of a screen displayed on a display unit of a photographing terminal.

Referring to FIG. 5, a specific description will be given. FIG. 5 is a diagram illustrating an example of a screen displayed on the display unit 14 of the photographing terminal 1. On a right-hand side of the displayed screen, an image 14*a* obtained by photographing the object to be welded is displayed. Welding lines La, Lb, Lc, and Ld displayed on the image 14*a* are the welding lines selected, from among the plurality of candidate welding lines shown by way of example in, e.g., FIG. 4, as the welding lines along which welding is to be actually performed by the operator. An input to select the welding lines is received by touching (tapping) the specified candidate welding lines from among the plurality of candidate welding lines displayed on the image 14*a* by following guidance such as, e.g., a voice/sound or a text message.

When the operator sequentially touches the plurality of welding lines La, Lb, Lc, and Ld on the image 14*a* by following guidance such as, e.g., a voice/sound or a text message, the order in which the welding lines were touched is received as the input to specify the welding order. In addition, when the operator traces (slides along) each of the welding lines La, Lb, Lc, and Ld on the image 14*a* in FIG. 5 by following guidance such as, e.g., a voice/sound or a text message, the direction in which the welding line was traced is received as the input to specify the welding direction. Instead of tracing the welding line, e.g., the welding starting position and the welding ending position may also be subjected to long-pressing or the like. In this case, a direction from the welding starting position to the welding ending position is received as the input to specify the welding direction.

The program production unit 215 illustrated in FIG. 2 produces a welding program for performing the arc welding on the basis of the welding order and the welding direction each specified for each of the welding lines. The program production unit 215 causes the storage unit 22 of the robot control device 2 to store the produced welding program. As a result, when the manipulator 3 performs the arc welding, it is possible that the control unit 21 of the robot control device 2 reads the welding program and controls the manipulator 3 such that the manipulator 3 performs the welding by following a welding procedure specified by the welding program.

As described previously, with the welding program production system according to the embodiment, it is possible to cause the candidate welding lines detected from the photographed image of the object to be welded to be displayed in superimposed relation on the image, receive the specification of the welding order and the welding direction for each of the welding lines selected from among the candidate welding lines, and produce the welding program on the basis of the specified order and direction. Accordingly, by sequentially specifying the welding orders and the welding directions for the plurality of candidate welding lines displayed in superimposed relation on the image of the object to be welded, it is possible to easily and efficiently produce the welding program.

Therefore, with the welding program production system according to the embodiment, it is possible to increase efficiency of a welding operation by the manipulator 3.

Modifications

Note that the present invention is not limited to the embodiment described above, and can variously be carried out in various other forms within the scope not departing from the gist of the present invention. Therefore, the embodiment described above is to be construed in all respects only as illustrative and not restrictive.

For example, in the welding program production system according to the embodiment described above, the welding lines are selected from among all the candidate welding lines included in the screen image. However, it may also be possible to limit the candidate welding lines targeted for selection to some of the candidates.

When the candidate welding lines are to be limited to some of the candidates, the candidate welding lines can be limited by using a position at which the manipulator 3 is to be disposed as a reference. In this case, the welding program production system preferably further includes a determination unit that determines a range weldable by the manipulator 3 on the basis of the position at which the manipulator 3 is to be disposed. In addition, the display control unit 213 preferably causes the candidate welding lines which are among all the candidate welding lines included in the screen image and present within the weldable range determined by the determination unit to be displayed as the candidate welding lines targeted for selection in superimposed relation on the image of the object to be welded.

The position at which the manipulator 3 is to be disposed can be specified by the operator through touching of the image of the object to be welded or the like by following guidance such as, e.g., a voice/sound or a text message. The range weldable by the manipulator 3 can be determined on the basis of a range within the reach of the welding torch 32 of the manipulator 3 when the manipulator 3 is disposed at, e.g., a specified position.

With the welding program production system according to this modification, it is possible to produce, for each position at which the manipulator 3 is to be disposed, a welding program intended for the welding lines present in the range weldable by the manipulator 3. Therefore, it is possible to further increase the efficiency of the welding operation by the manipulator 3.

What is claimed is:

1. A welding program production system comprising:
   a determination unit that determines a weldable range of a welding robot based on a position at which the welding robot is to be disposed in relation to an object to be welded and a welding reach within a range of a welding torch disposed on a welding robot manipulator;
   an image sensor that captures an image of the object to be welded;
   a display control unit that causes a plurality of candidate welding lines detected based on the image of the object to be welded that is present within the determined weldable range to be displayed superimposed upon the image;
   an input receiving unit that receives, from a user, a plurality of inputs to select the welding lines from among the displayed plurality of candidate welding lines, wherein the plurality of inputs comprises a first input to sequentially specify a welding line order and a second input to specify a welding direction for each of the selected welding lines; and
   a program production unit that produces a welding program on the basis of the specified welding order and welding direction.

2. The welding program production system according to claim 1, wherein the input receiving unit receives, as the input to specify the welding direction, an input to specify a welding starting position and a welding ending position.

3. The welding program production system according to claim 1, wherein the input receiving unit receives, as the input to specify the welding direction, an input to trace each of the welding lines.

4. The welding program production system according to claim 1, further comprising:
   a welding line detection unit that calculates, based on the image, coordinate data corresponding to the object to be welded and detects, based on the coordinate data, the plurality of candidate welding lines.

5. A welding program production method to be implemented by a processor, the method comprising:
   obtaining an image of an object to be welded;
   detecting a plurality of candidate welding lines based on the image;
   determining a weldable range of a welding robot based on a position at which the welding robot is to be disposed in relation to the object to be welded and a welding reach within a range of a welding torch disposed on a welding robot manipulator;
   displaying the plurality of candidate welding lines detected based on the image of the object to be welded that is present within the determined weldable range-of the welding robot superimposed upon the image;
   receiving, from a user, a plurality of inputs to select welding lines from among the plurality of displayed candidate welding lines, wherein the plurality of inputs comprises a first input to sequentially specify a welding line order and a second input to specify a welding direction for each of the selected welding lines; and
   producing a welding program on the basis of the specified welding order and welding direction.

* * * * *